United States Patent
Yamashita et al.

(12)

(10) Patent No.: US 9,057,395 B2
(45) Date of Patent: Jun. 16, 2015

(54) ONE PIECE HYDRAULIC DISC BRAKE CALIPER WITH ONE WAY PLUMBING

(71) Applicant: SHIMANO INC., Sakai, Osaka (JP)

(72) Inventors: Takahiro Yamashita, Sakai (JP); Shinichi Takizawa, Sakai (KR)

(73) Assignee: SHIMANO INC., Sakai (JP)

( * ) Notice: Subject to any disclaimer, the term of this patent is extended or adjusted under 35 U.S.C. 154(b) by 108 days.

(21) Appl. No.: 13/933,065

(22) Filed: Jul. 1, 2013

(65) Prior Publication Data

US 2013/0294865 A1   Nov. 7, 2013

Related U.S. Application Data

(62) Division of application No. 12/498,133, filed on Jul. 6, 2009, now Pat. No. 8,534,428.

(51) Int. Cl.
| | |
|---|---|
| *F16B 35/02* | (2006.01) |
| *B60T 7/10* | (2006.01) |
| *B60T 11/16* | (2006.01) |
| *F16D 55/228* | (2006.01) |
| *F16D 125/04* | (2012.01) |
| *F16D 125/06* | (2012.01) |
| *F16D 125/16* | (2012.01) |

(52) U.S. Cl.
CPC ................ *F16B 35/02* (2013.01); *B60T 7/102* (2013.01); *B60T 11/16* (2013.01); *F16D 55/228* (2013.01); *F16D 2125/04* (2013.01); *F16D 2125/06* (2013.01); *F16D 2125/16* (2013.01)

(58) Field of Classification Search
CPC ................ F16B 35/041; F16B 35/02
USPC .................. 411/417, 418, 424, 395
See application file for complete search history.

(56) References Cited

U.S. PATENT DOCUMENTS

| | | | | | |
|---|---|---|---|---|---|
| 1,926,925 | A | * | 9/1933 | Wescott | 403/296 |
| 2,371,614 | A | * | 3/1945 | Graves | 74/579 E |
| 2,428,783 | A | * | 10/1947 | Cole | 411/301 |
| 3,384,394 | A | * | 5/1968 | O'Connor | 285/190 |
| 3,943,817 | A | | 3/1976 | Mess | |
| 4,114,961 | A | * | 9/1978 | Pithie | 384/430 |

(Continued)

FOREIGN PATENT DOCUMENTS

| | | |
|---|---|---|
| AT | 413298 B | 1/2006 |
| CN | 1241513 A | 1/2000 |

(Continued)

OTHER PUBLICATIONS

Office Action issued on Nov. 14, 2011 in related U.S. Appl. No. 12/498,161.

(Continued)

*Primary Examiner* — Flemming Saether
(74) *Attorney, Agent, or Firm* — Jeffer Mangels Butler & Mitchell LLP; Brennan C. Swain, Esq.

(57) ABSTRACT

A bolt for use with a hydraulic disc brake caliper. The bolt includes a head and a shaft extending outwardly from the head. The shaft includes a threaded portion having a diameter, at least one channel defined in the outer surface of the threaded portion, first and second reduced diameter portions defined at least partially circumferentially around the shaft and a blocking portion separating the first and second reduced diameter portions.

12 Claims, 8 Drawing Sheets

(56) References Cited

U.S. PATENT DOCUMENTS

| | | | |
|---|---|---|---|
| 4,470,735 A * | 9/1984 | Salisbury | 411/353 |
| 4,754,856 A | 7/1988 | Villata | |
| 5,011,192 A | 4/1991 | Campo | |
| 5,150,772 A | 9/1992 | Pantale | |
| 5,228,725 A | 7/1993 | Aoyagi | |
| H001258 H | 12/1993 | Hindle, Jr. | |
| 5,515,948 A | 5/1996 | Gilliland | |
| 5,533,764 A | 7/1996 | Williamson | |
| 6,679,663 B2 | 1/2004 | DiStasio | |
| 6,688,440 B2 | 2/2004 | Matsushita | |
| 7,017,952 B2 | 3/2006 | Brewer | |
| 7,318,502 B2 | 1/2008 | Costa | |
| 2002/0141846 A1* | 10/2002 | McGough | 411/378 |
| 2003/0108403 A1 | 6/2003 | Scoyoc | |
| 2005/0201848 A1* | 9/2005 | Reilly | 411/353 |
| 2007/0182156 A1 | 8/2007 | Petrykowski | |
| 2009/0200121 A1 | 8/2009 | Takizawa | |
| 2009/0200128 A1 | 8/2009 | Takizawa | |

FOREIGN PATENT DOCUMENTS

| | | |
|---|---|---|
| CN | 1306928 A | 8/2001 |
| CN | 1330014 A | 1/2002 |
| CN | 1675489 A | 9/2005 |
| DE | 2309330 | 9/1973 |
| DE | 103 09 297 A1 | 9/2004 |
| JP | 09004622 A | 1/1997 |
| JP | 09004623 A | 1/1997 |
| JP | 09021411 A | 1/1997 |

OTHER PUBLICATIONS

Office Action issued by the State Intellectual Property Office, P.R. China on Jul. 25, 2012 in related application 200910216908.5.

* cited by examiner

ONE PIECE HYDRAULIC DISC BRAKE CALIPER WITH ONE WAY PLUMBING

CROSS-REFERENCE TO RELATED APPLICATIONS

This application is a divisional application of U.S. patent application Ser. No. 12/498,133, filed Jul. 6, 2009, the entirety of which is incorporated herein by reference.

FIELD OF THE INVENTION

The present invention relates to hydraulic disc brakes, and more particularly, to a hydraulic disc brake caliper with one way plumbing.

BACKGROUND OF THE INVENTION

In recent years, certain high performance bicycles have included hydraulic disc brakes. Hydraulic disc brake systems typically include a caliper housing, a first movable brake pad and a second fixed or movable brake pad. The movable brake pad is typically attached to a piston that is movable in response to fluid pressure applied via a hydraulic fluid conduit in the caliper housing. The brake pads are positioned on either side of a rotor, which is attached to the front or back wheel of a bicycle. Upon the application of fluid pressure to the piston or pistons, the brake pads come into contact with the rotor, thereby applying frictional resistance and causing the bicycle to slow down or stop.

Hydraulic disc brake systems for bicycles are typically actuated by a brake lever attached to a bicycle handlebar. They also typically include a master piston in a master cylinder which is actuated by the brake lever. The master cylinder contains a hydraulic fluid and is in fluid communication with the disc brake caliper via a fluid conduit. The brake pads are typically spaced apart from the rotor by a predetermined gap. As the lever is contracted towards the handlebar, the master piston moves, thereby forcing liquid out of the master cylinder and into a conduit connected to the caliper housing. The movement of fluid into caliper housing causes the pistons to move, eventually bringing the brake pads into contact with the rotor.

When initially filling the hydraulic disc brake system (including the master cylinder and the caliper), the system must be bled to remove gas bubbles from the system and optimize performance of the brakes. Many prior art calipers include a branched hydraulic fluid pathway therein. In other words, after the fluid enters through the fluid inlet, it branches into two separate conduits, one that goes to one piston and another that goes to the piston on the other side (and another branch to the fluid outlet). This can make bleeding the brakes difficult because the bubbles get caught in the various branches. A need exists for a hydraulic disc brake caliper that is easy to bleed.

SUMMARY OF THE PREFERRED EMBODIMENTS

In accordance with one aspect of the present invention, there is provided a hydraulic disc brake caliper that includes a housing that has first and second side portions and first and second end portions that cooperate to define a braking opening, first and second piston receiving openings and first and second fluid openings. The housing also includes a bolt received in the second fluid opening that includes a shaft having a portion of a fluid path defined in the outer surface thereof that includes at least one channel and at least one reduced diameter portion. The fluid path extends from the first fluid opening to the second fluid opening. The at least one channel and the at least one reduced diameter portion are part of the fluid path and are in fluid communication between the first and second piston receiving openings.

In accordance with another aspect of the present invention, there is provided hydraulic disc brake caliper that includes a housing having first and second side portions and first and second end portions that cooperate to define a braking opening. The housing also includes first and second fluid openings defined therein and a fluid path. A bolt is received in the second fluid opening in the housing. The bolt includes a shaft having a portion of a fluid path defined in the outer surface thereof that includes at least one channel and at least one reduced diameter portion. The at least one channel and the at least one reduced diameter portion are in fluid communication. The fluid path extends from the first fluid opening through the portion of the fluid path defined in the outer surface of the bolt, and to the second fluid opening. In a preferred embodiment, the portion of the fluid path defined in the outer surface of the bolt includes first and second reduced diameter portions that are separated by a blocking portion and the fluid path extends from the first fluid opening, through the at least one channel, through the first reduced diameter portion, through the second reduced diameter portion and to the second fluid opening.

In accordance with another aspect of the present invention, there is provided a bolt for use with a hydraulic disc brake caliper. The bolt includes a head and a shaft extending outwardly from the head. The shaft includes a threaded portion having a diameter, at least one channel defined in the outer surface of the threaded portion, first and second reduced diameter portions defined at least partially circumferentially around the shaft, and a blocking portion separating the first and second reduced diameter portions.

The present invention is applicable to all types of devices and is not limited to bicycles.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Referring initially to FIGS. 1-8, a preferred embodiment of a bicycle disc brake caliper 11 is described. Bicycle disc brake caliper 11 is preferably a hydraulic brake disc caliper operatively connected to a hydraulic brake lever assembly.

It will be appreciated that terms such as "front," "back," "top," "bottom," "side," and the like used herein are merely for ease of description and refer to the orientation of the components as shown in the figures. It should be understood that any orientation of the caliper 11 and the components thereof described herein is within the scope of the present invention.

Figure 1:
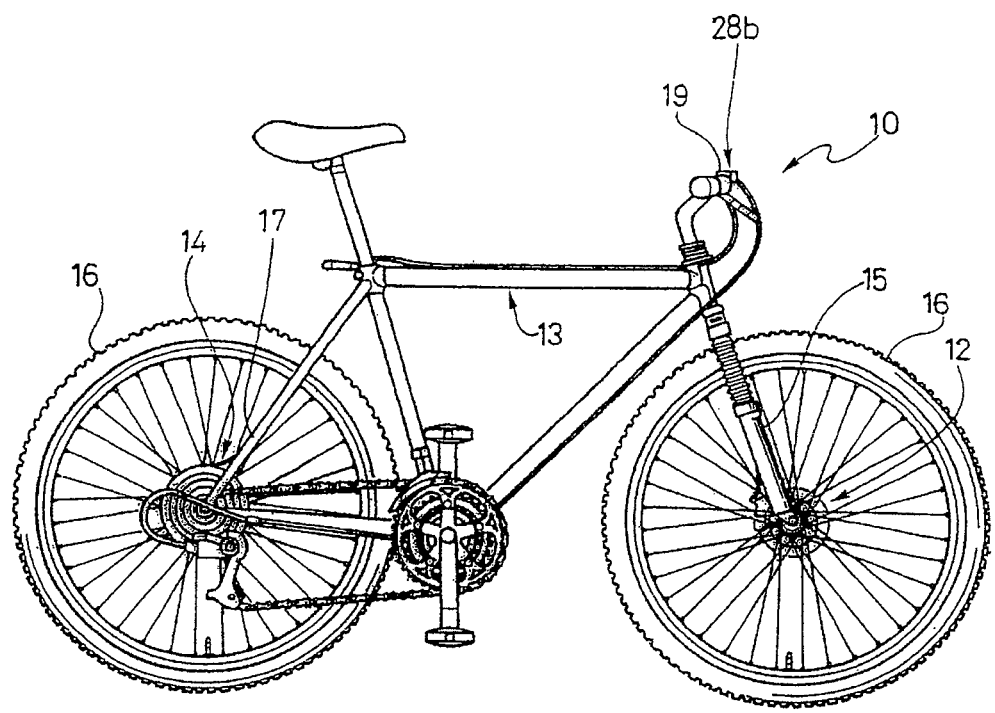
FIG. 1 is a side elevational view of a bicycle with a front disc brake assembly and a rear disc brake assembly in accordance with an embodiment of the present invention.

As shown in FIG. 1, a bicycle 10 with a front disc brake assembly 12 and a rear disc brake assembly 14 is illustrated in accordance with a preferred embodiment of the present invention. Other than the calipers, the front and rear disc brake assemblies 12 and 14 are relatively conventional fluid operated disc brakes fixedly coupled to a frame 13. Therefore, many of the components of the disc brake assemblies 12 and 14 will not be discussed or illustrated in detail herein except as modified by the preferred embodiments of the present invention, as discussed below. Furthermore, it will be understood that the bicycle disc brake caliper 11 can be used with either the front disc brake assembly 12 and a rear disc brake assembly 14.

Specifically, front disc brake assembly 12 is fixedly coupled to a front fork 15 of frame 13, and rear disc brake assembly 14 is fixedly coupled to rear fork 17 of frame 13. Frame 13 includes a handle bar 19 mounted to front fork 15 to steer the bicycle 10. Bicycle 10 includes a pair of wheels 16 rotatably coupled to the bicycle frame 13. One wheel 16 is coupled to front fork 15, and one wheel 16 is coupled to rear fork 17. Each wheel 16 has a disc brake rotor 18 fixedly coupled thereto in a conventional manner.

Figure 2:
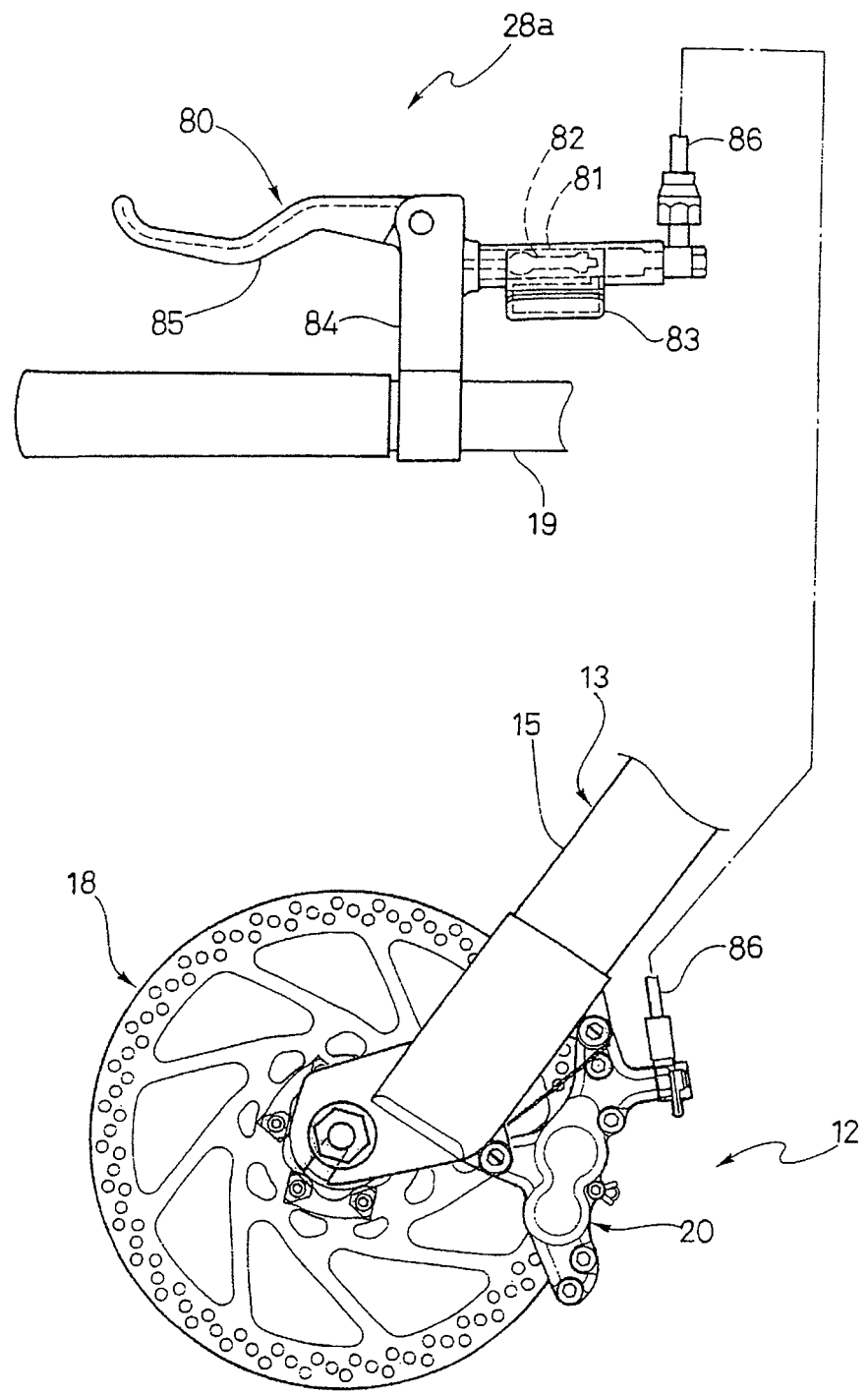
FIG. 2 is a side elevational view of the front disc brake assembly coupled to a front fork and a front disc brake operating mechanism of the bicycle illustrated in FIG. 1.
Figure 3:
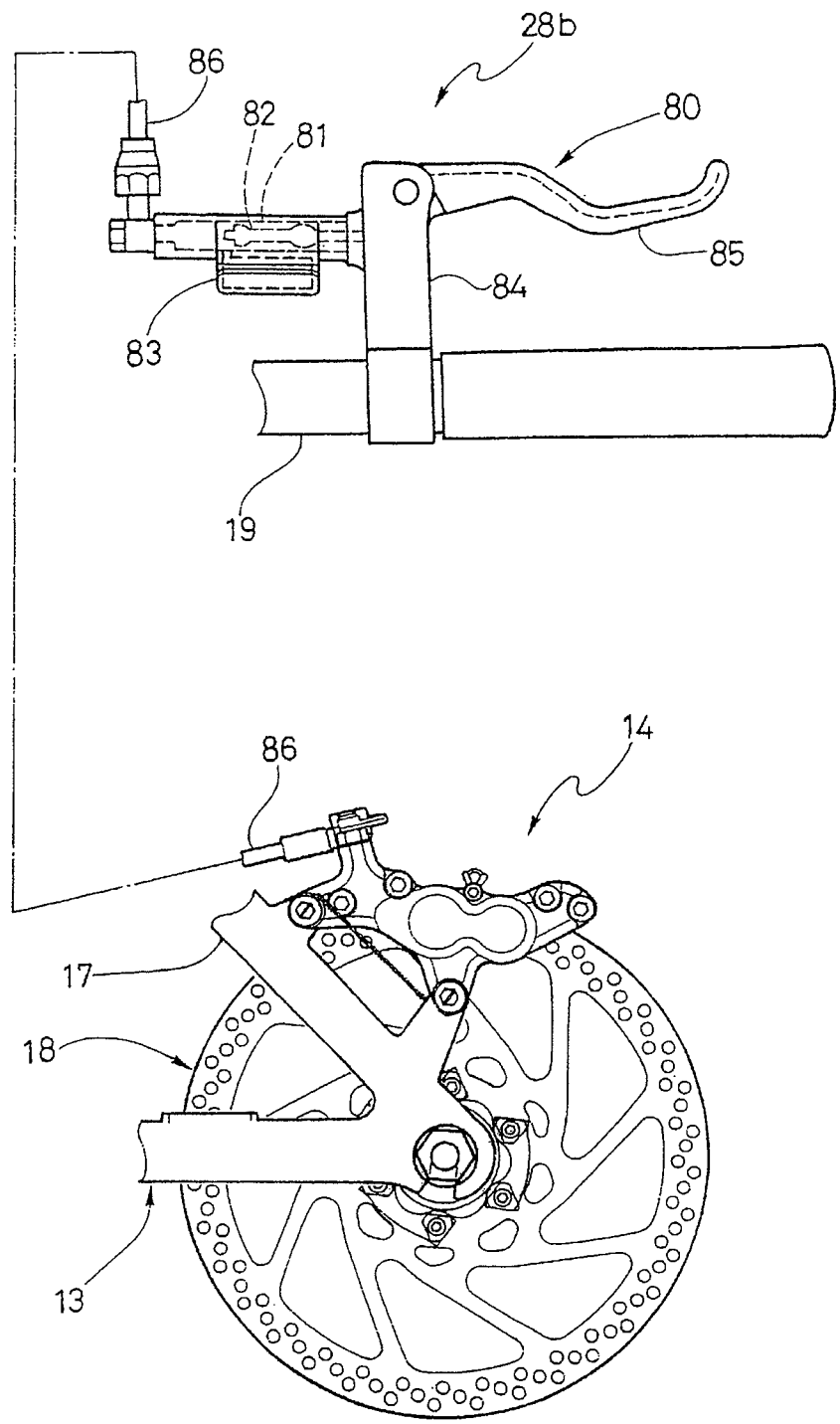
FIG. 3 is a side elevational view of the rear disc brake assembly coupled to a rear fork and a rear disc brake operating mechanism of the bicycle illustrated in FIG. 1.

The bicycle 10 and various components thereof are relatively conventional. Therefore, bicycle 10 and its various components will not be discussed or illustrated in detail herein, except as these components relate to bicycle disc brake caliper 11 and front and rear disc brake assemblies 12 and 14 in accordance with the preferred embodiments of the present invention. Moreover, front and rear disc brake assemblies 12 and 14 are substantially identical. Therefore, it will be understood that caliper 11 can be used with both front disc brake assembly 12 or rear disc brake assembly 14. It will further be understood that the front and rear disc brake assemblies 12 and 14 can include calipers 11 that have any number of pistons therein. For example, the calipers 11 shown in FIGS. 2 and 3 are four piston type calipers. However, the calipers 11 shown in FIGS. 5-8 include only two pistons. Accordingly, a caliper with any number of pistons is within the scope of the present invention provided the calipers 11 include one-way plumbing, as described below.

Figure 7:
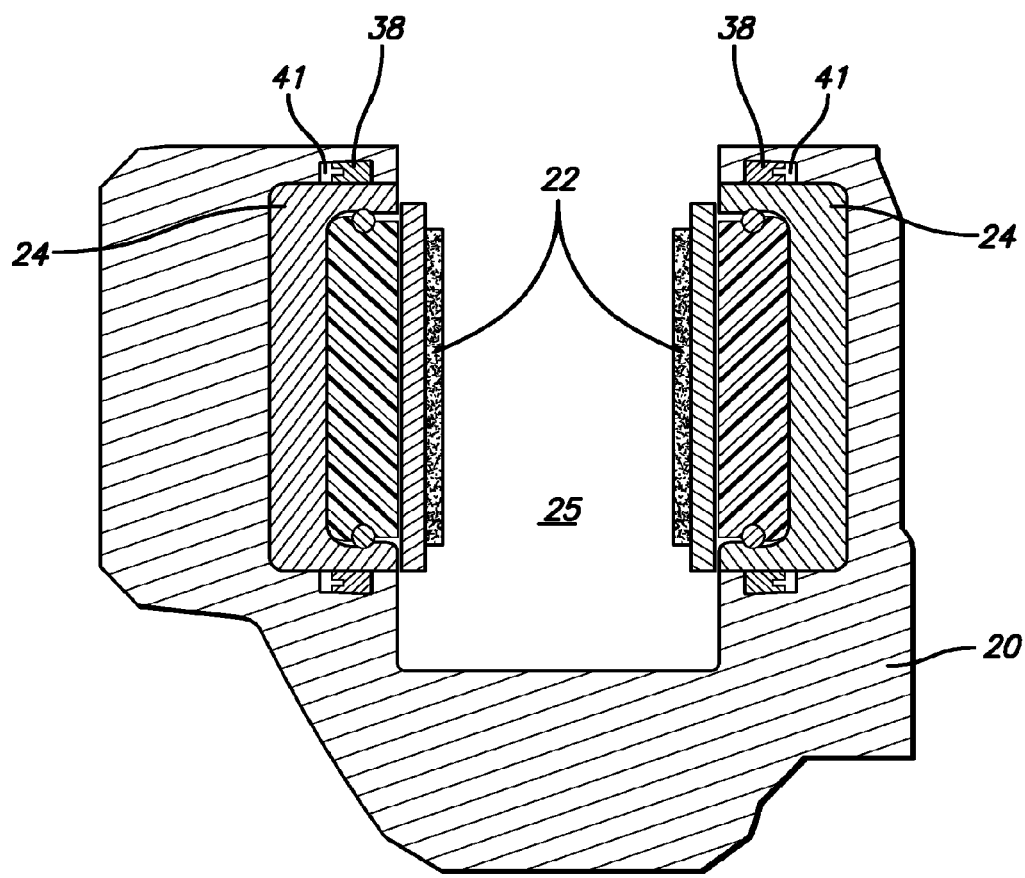
FIG. 7 is a cross-sectional top plan view of the disc brake caliper of FIG. 5 taken along line 7-7 of FIG. 5, which includes the pistons and brake pads.

Front disc brake assembly 12 basically includes caliper 11 and a brake operating mechanism or lever assembly 28a. Caliper 11 includes a caliper housing 20, a pair of friction members 22, and a plurality of pistons 24 disposed in the housing 20 (as shown in FIG. 7). Caliper housing 20 is fixedly coupled to front forks 15 in a conventional manner using threaded fasteners. First and second friction members 22 are coupled to caliper housing 20 to form a rotor receiving slot therebetween. At least one of the friction members 22 is movable relative to caliper housing 20, and preferably both friction members are movable relative to caliper housing 20. At least one piston 24 is movably coupled to caliper housing 20. Preferably, each piston 24 is movably coupled to caliper housing 20.

Referring to FIGS. 5-8, caliper housing 20 is preferably formed of rigid metallic material such as cast aluminum. In a preferred embodiment, caliper housing 20 is formed as a single unit or piece. In other words, it is not formed as two halves that are bolted together, as is common in prior art calipers. However, in an alternative embodiment, the caliper housing 20 can comprise two separate halves that are fixedly coupled together by a plurality of bolts. Caliper housing 20 includes a first fluid opening or fluid inlet 32 for receiving a fluid, typically hydraulic oil. Caliper housing 20 also includes a second fluid opening or fluid outlet 34 for receiving a bolt 50. The first and second fluid openings 32 and 34 can be threaded, but do not have to be.

Caliper housing 20 preferably includes at least two ports or piston receiving openings 36a and 36b for receiving a piston 24, as shown in FIGS. 5-8. The piston receiving openings 36a and 36b are arranged to oppose one another. As shown in FIG. 7, each piston 24 is arranged to move one of the friction members 22 toward disc brake rotor 18 (the braking direction).

Each piston receiving opening 36 is preferably an annular opening sized and configured to receive one of the pistons 24 therein. Moreover, each piston receiving opening 36 also preferably includes a circumferential groove 41 for receiving a sealing member 38 for preventing fluid from escaping therefrom.

The seals are annular members formed of a resilient material such as rubber or flexible plastic. Each seal acts to circumferentially seal the internal area of one of the piston receiving openings 36 from the outside of caliper housing 20 when pistons 24 are arranged in piston receiving openings 36. Therefore, when actuating fluid is supplied to piston receiving openings 36, pistons 24 are moved toward rotor 18. Accordingly, friction members 22 are also moved toward disc brake rotor 18 to produce a stopping action on rotor 18, and therefore, wheel 16.

Preferably, caliper housing 20 has two friction members movably coupled thereto, as discussed above. Moreover, friction members are preferably movably coupled to caliper housing 20 such that a rotor receiving slot is formed therebetween. Each friction member basically includes a plate with a friction material fixedly coupled thereto in a conventional manner. Each plate is preferably formed of a rigid metallic material in a conventional manner. Each plate includes a mounting hole for slidably receiving a mounting pin therethrough. Mounting pin is partially threaded at one end and receives a securing member on the opposite end to secure friction members to caliper housing in a conventional manner. Drawings showing these components are shown in U.S. Pat. No. 6,491,144, the entirety of which is incorporated herein by reference.

Figure 6:
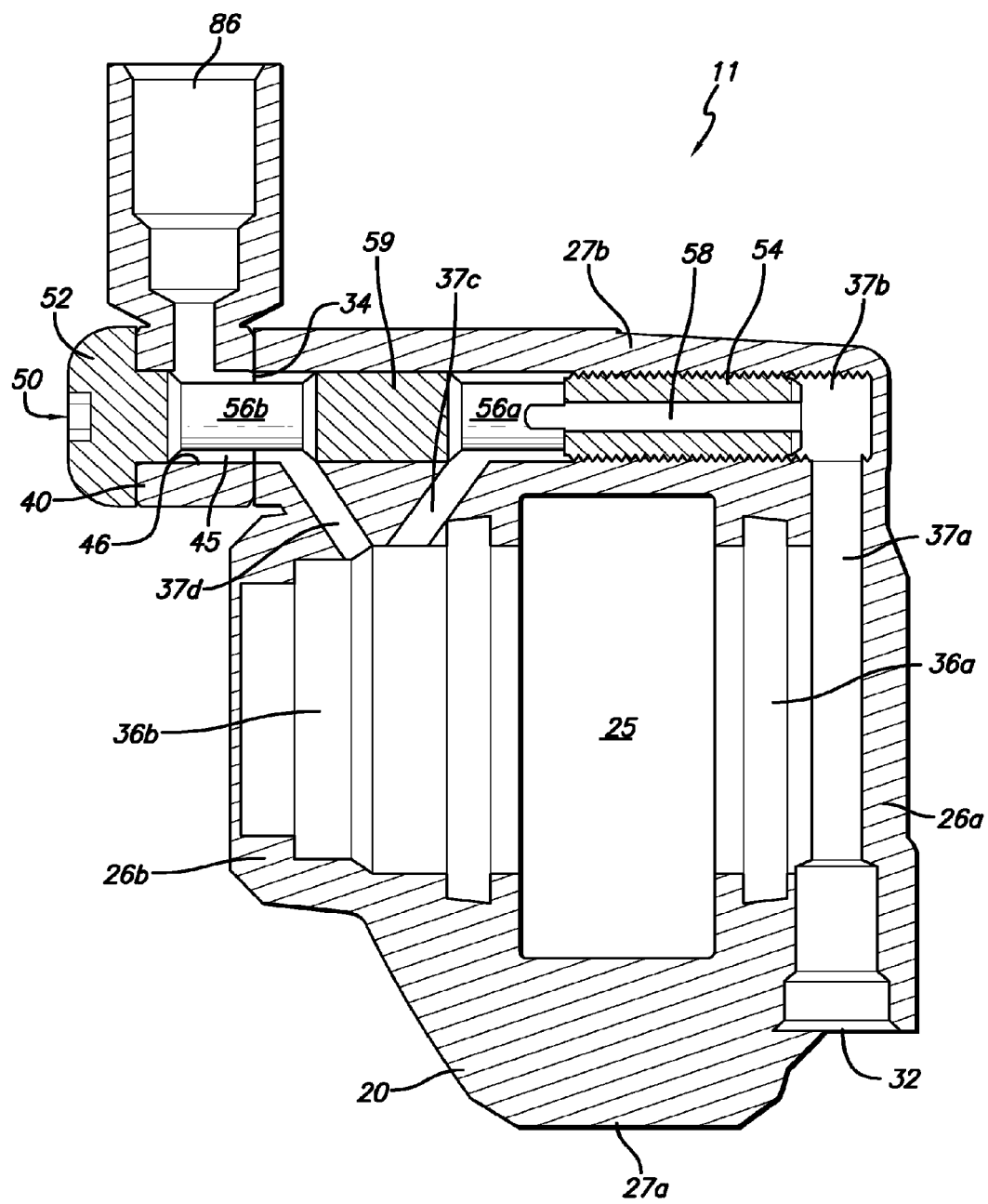
FIG. 6 is a cross-sectional top plan view of the disc brake caliper of FIG. 5 taken along line 6-6 of FIG. 5.

Generally, as is best shown in FIG. 6, the caliper housing 20 is comprised of four sections or portions, first and second side portions 26a and 26b and first and second end portions 27a and 27b, that cooperate to define a braking opening 25.

Piston receiving openings 36a and 36b are in fluid communication with first and second fluid openings 32 and 34 via a network of fluid conduits 37 and the fluid path defined through bolt 50 (discussed below). Thus, when actuating/hydraulic fluid is supplied to caliper housing 20, the actuating fluid flows through the network of conduits 37a, 37b, 37c and 37d, through the fluid path in bolt 50 and into the piston receiving openings 36. For ease of description and because the conduits 37a, 37b, 37c and 37d operate in generally the same manner, the conduits may be referred to herein generically without the "a," "b," etc. suffix (same with the piston receiving openings 36a and 36b). For example, the conduits may be referred to individually as first conduit 37a, second conduit 37b, third conduit 37c or fourth conduit 37d or they may be referred to generically as conduit(s) 37.

Figure 5:
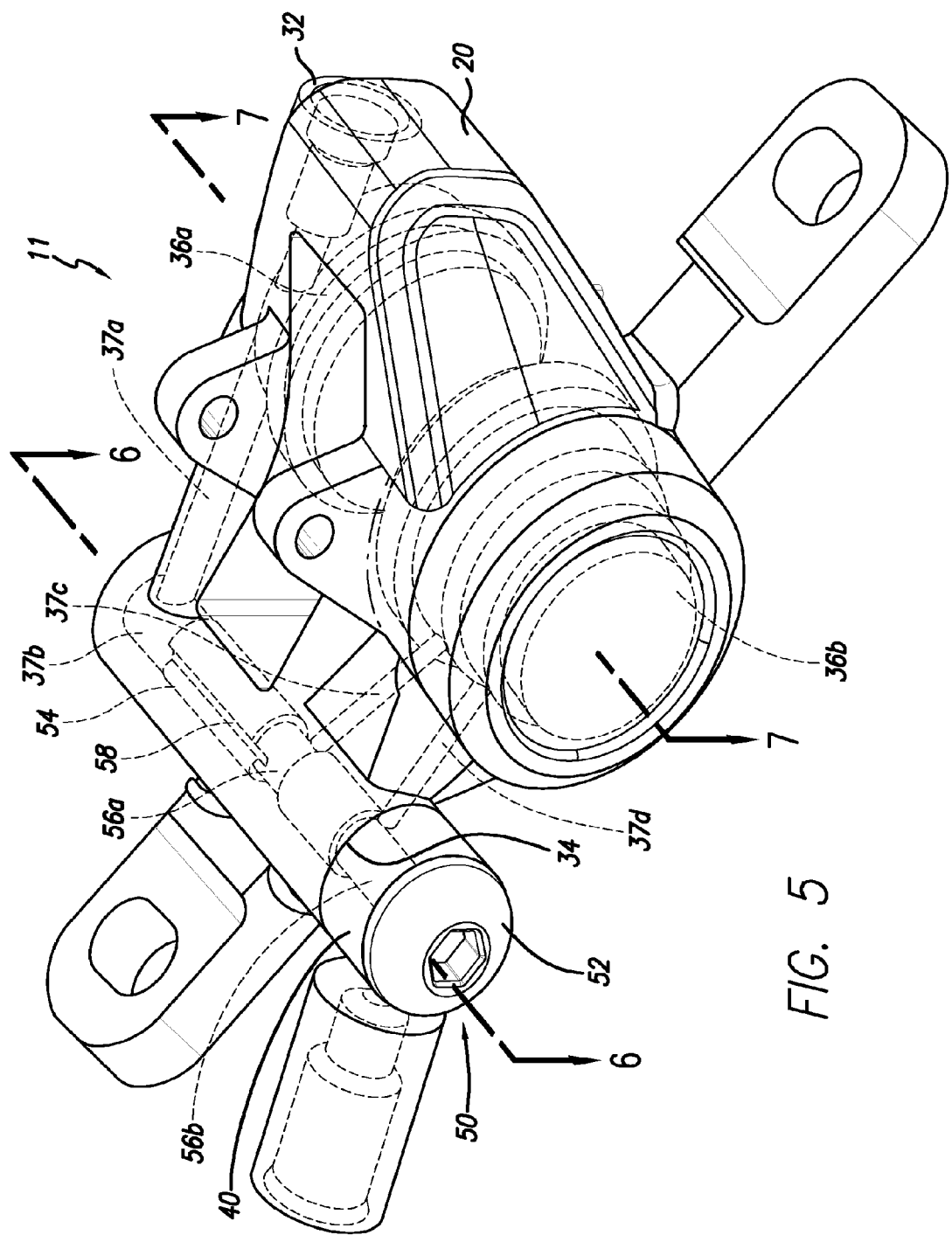
FIG. 5 is a perspective view of a one piece disc brake caliper with the bolt of FIG. 4 and showing the conduits and ports it hidden lines.

As shown in FIG. 6, first conduit 37a extends from first fluid opening 32, passes through the piston receiving opening 36a and into second end portion 27b. In a preferred embodiment, second conduit 37b extends through second end portion 27b in a direction that is generally parallel to the direction that the pistons move (the braking direction). Third conduit 37c extends from second conduit 37b and to piston receiving opening 36b. Fourth conduit 37d extends from piston receiving opening 36b back to second conduit 37b and to second opening 34. As can be seen in FIGS. 5 and 6, bolt 50 is adapted to direct fluid from second conduit 37b to piston receiving opening 36b via third and fourth fluid conduits 37c and 37d.

Figure 4:
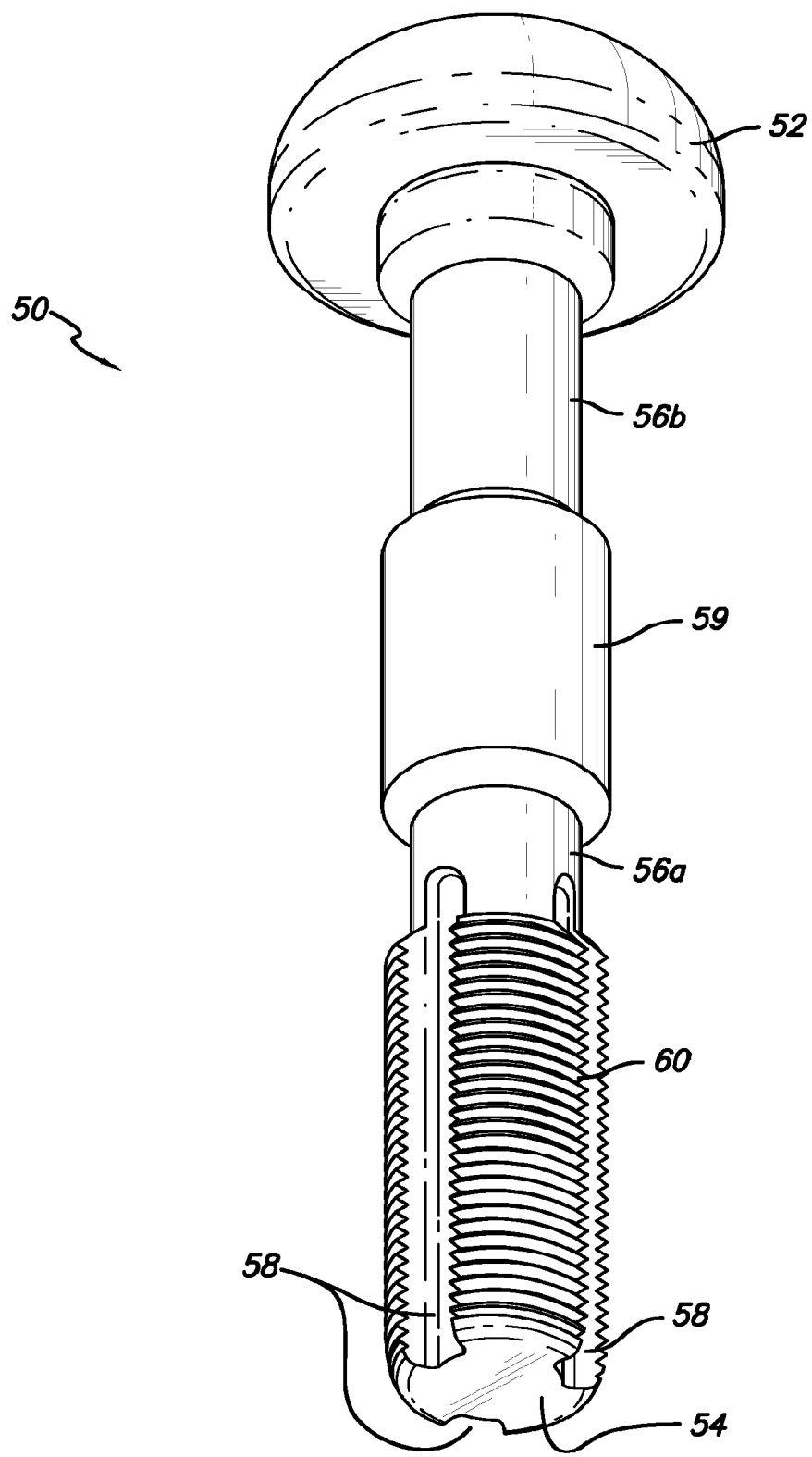
FIG. 4 is a perspective view of a bolt for use with a one piece hydraulic disc brake caliper in accordance with an embodiment of the present invention.

With reference to FIG. 4, bolt 50 includes head 52, a shaft 54, first and second reduced diameter portions 56a and 56b, a plurality of channels 58 and a blocking portion 59 separating the first and second reduced diameter portions 56a and 56b. In a preferred embodiment, the shaft 54 of the bolt 50 includes three axially extending channels 58 arranged circumferentially therearound and spaced apart 120°, as is shown in FIG. 4. However, any number of channels 58 (e.g., one or more) are within the scope of the present invention. Also, the channels 58 do not have to be spaced equidistant from one another. The channels 58 preferably extend parallel to the axis of the shaft 54. However, this is not a limitation on the present invention. For example, the channels could extend in a spiral around the shaft 54. The goal of the channels 58 is to allow fluid to flow from the end of the shaft 54 furthest from the head 52 to the first recessed portion or reduced diameter portion 56a no that it can be directed to the third fluid conduit 37c. If the channels 58 were to extend in a spiral shape, it will be understood that the fluid is still flowing generally axially along the outside of the shaft 54, but that it is not necessarily parallel to the axis. Therefore, as used herein, generally axially means the distance traveled by the channels can be parallel to the axis or non-parallel to the axis as long as the total distance is further in an axial direction than in a transverse direction.

Figure 8:
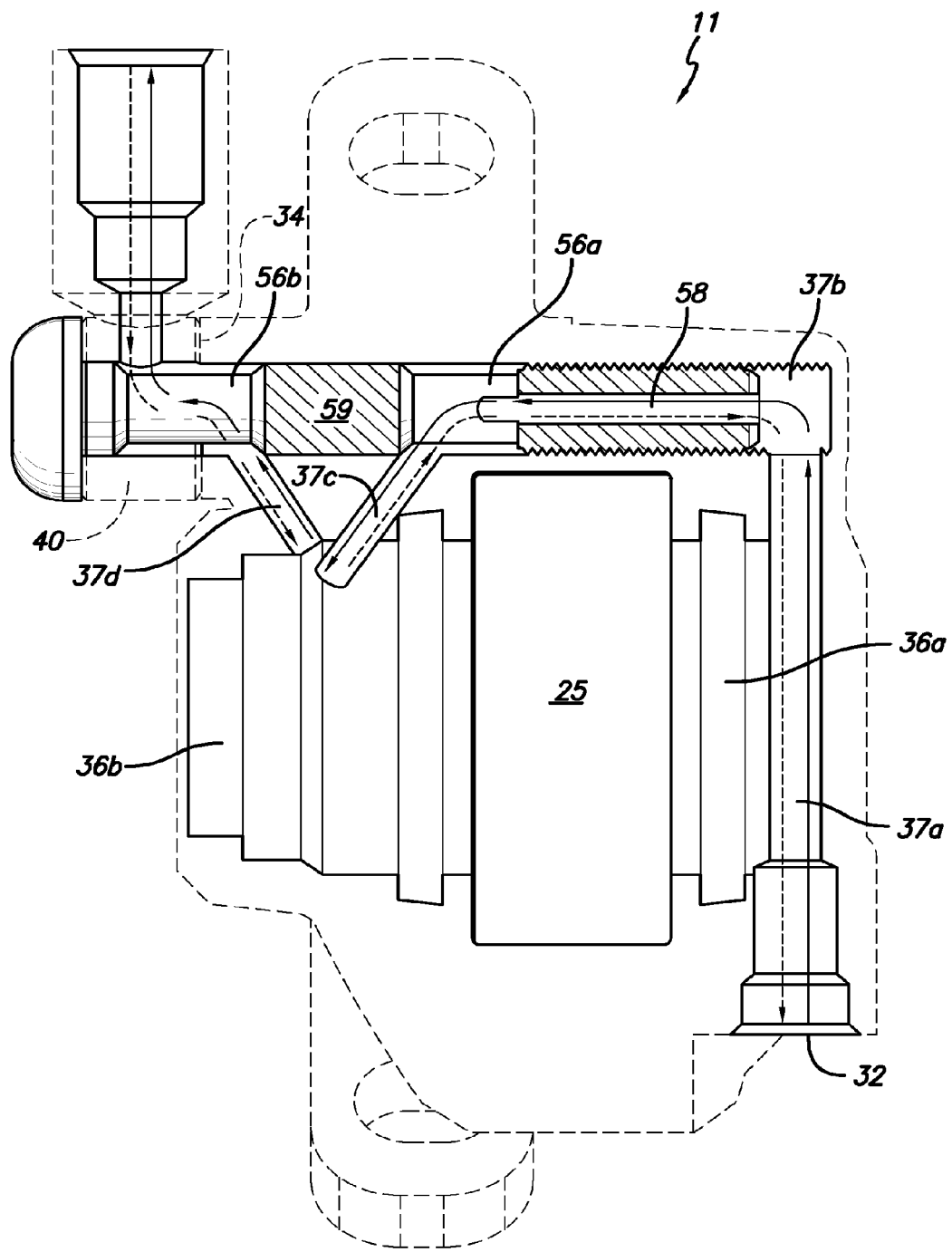
FIG. 8 is a schematic showing the fluid path in the conduits and bolt of the disc brake caliper of FIG. 5.

As is best shown in FIG. 6, the shaft 54 of bolt 50 is received in an opening 45 in a fluid coupling unit 40 and is threaded (via threads 60) into second fluid conduit 37b. It will be understood that the fluid coupling unit 40 is a generic fluid coupling unit and any such unit is within the scope of the present invention. As shown in FIG. 8, the fluid path extends from first fluid opening 32, through first fluid conduit 37a and piston receiving opening 36a through second fluid conduit 37b, through the channels 58, through the first reduced diameter portion 56a, through third fluid conduit 37c, to piston receiving opening 36b, through fourth fluid conduit 37d, through the second reduced diameter portion 56b and out through the fluid coupling unit 40 to the master cylinder (via the hydraulic line 86). This is the path that fluid takes when filling the caliper 11. In other words, all of the fluid conduits 37, reduced diameter portions 56, piston receiving openings 36, channels 58 and the fluid coupling unit 40 are all in fluid communication along a non-branched continuous fluid path. In a preferred embodiment, as is shown in FIG. 6, a portion of the second recessed portion 56b is located in the housing 20 and a portion of the second recessed portion 56b is located in the fluid coupling unit 40. The assembly can include o-rings (not shown) between the fluid coupling unit 40 and housing 20 and/or bolt head 52 for sealing the fluid path.

The interior surface 46 of the opening 45 in the fluid coupling unit 40 has a diameter and has a hole 47 defined therein that is in fluid communication with the hydraulic line 86 extending from the fluid coupling unit 40. As can be seen in FIG. 6, the diameter of the second reduced diameter portion 56b has a diameter that is less than the diameter of the inner surface 46 of the fluid coupling unit 40 and the diameter of the first reduced diameter portion 56a has a diameter that is less than the diameter of the inner surface of fluid conduit 37b. This creates a space that is part of the fluid path.

As is shown in FIG. 4, the first and second reduced diameter portions 56a and 56b extend circumferentially around the shaft 54. In a preferred embodiment, the first and second reduced diameter portions 56a and 56b extend all the way or 360° around the shaft 54. However, this is not a limitation on the present invention. In another embodiment, the first and second reduced diameter portions 56a and 56b may only extend partially around the shaft 54. It will be understood that an inventive aspect of the present invention is that at least a portion of the fluid path extends axially along the shaft 54 and is open to the outside of bolt 50.

This arrangement of the conduits 37 and fluid path through the bolt 50 makes the entire brake system (from caliper to lever assembly) easier to bleed than the prior art. As described above, many prior art systems have branched conduit networks. In other words, the fluid enters through an inlet and then branches to the pistons on either side of the rotor. In the present invention, the fluid path provides for one-way, continuous fluid flow with no branches. As shown by the solid arrows in FIG. 8, this provides a one-way path when filling the caliper housing 20 with fluid. And, as shown by the dashed arrows in FIG. 8, this provides a one-way path for bleeding air/gas, which allows the air/gas to be more easily removed from the fluid in the braking system. For example, the brake system bleeding technique taught in the SAINT Braking System Technical Service Instructions (SI-8CZ0E), published by Shimano Inc. in May, 2005, the entirety of which is incorporated herein by reference, can be used to bleed the brakes. It will be understood that, as used herein, one-way does not mean that the fluid can only move in one direction, but it means that the plumbing or conduit system is not branched. Fluid going into the piston receiving openings 36 is not considered a branch.

Referring again to FIGS. 1-3, brake operating mechanisms 28a and 28b are conventional disc brake operating mechanisms. Therefore, brake operating mechanisms 28a and 28b will not be discussed or illustrated in detail herein. It will be understood that the calipers shown in FIGS. 1-3 are for illustrative purposes only. Brake operating mechanisms 28a and 28b are provided to control disc brake assemblies 12 and 14. Brake operating mechanisms 28a and 28b are preferably fixedly mounted on handle bar 19 adjacent the hand portions of handle bar 19. Accordingly, brake operating mechanisms 28a and 28b are operated in a conventional manner such that disc brake assemblies 12 and 14 move friction members from a release position in which bicycle wheels 16 and the disc brake rotors 18 are free to rotate, and a braking position. In the braking position, disc brake assemblies 12 and 11 apply a braking force against disc brake rotor 18 to stop rotation of bicycle wheels 16 and disc brake rotors 18.

Brake operating mechanisms 28a and 28b will now be described in more detail. Basically, brake operating mechanisms 28a and 28b are designed to actuate the disc brake assemblies 12 and 14 in a conventional manner to apply a forcible gripping action on disc brake rotor 18 to stop rotation of one of the front wheels 16. Brake operating mechanism 28b actuates rear disc brake assembly 14 and brake operating mechanism 28a actuates front disc brake assembly 12. Brake operating mechanism 28b is identical to brake operating mechanism 28a except brake operating mechanism 28b is a mirror image of brake operating mechanism 28a. Each of the brake operating mechanisms 28a and 28b basically includes a brake lever 80, a hydraulic or master cylinder 81, hydraulic or master piston 82, and an actuation fluid reservoir 83. Preferably, each of the brake operating mechanisms 28a and 28b is a single unit, which is mounted on handlebar 19.

In particular, referring to either one of the brake operating mechanisms 28a and 28b, brake lever 80 includes a mounting portion 84 and a lever portion 85. Mounting portion 84 is designed to be clamped onto handle bar 19 in a conventional manner. Mounting portion 84 is integrally formed with master cylinder 81 such that master cylinder 81, master piston 82 and actuation fluid reservoir 83 are all supported on mounting portion 84 of brake lever 80. Lever portion 85 is pivotally coupled to mounting portion 84 for movement between a release position and a braking position. Normally, lever portion 84 is maintained in a release position in a conventional manner.

Master piston 82 is movably mounted within master cylinder 81 in a conventional manner. More specifically, actuation fluid reservoir 83 is mounted on master cylinder 81 and is in fluid communication with the interior bore of master cylinder 81 for supplying actuation fluid thereto. Master piston 82 is connected at one end to lever portion 85 for axially moving master piston 82 within master cylinder 81. Accordingly, actuation of lever portion 85 causes master piston 82 to move axially within master cylinder 81. This movement of master piston 82 within master cylinder 81 directs fluid pressure through a hydraulic line 86 which is coupled to one of the disc brake assemblies 12 and 14 via fluid coupling units 33. Thus, the pressurized actuating fluid causes the pistons 24 and friction members to move so as to engage disc brake rotors 18 to stop rotation of wheels 16.

It will be understood that due to the reversibility of the fluid path described above, regardless of which reduced diameter portion, side portion, end portion, conduit, port, piston receiving opening, etc. is designated as "first" or "second" in the specification, that when reading the claims below, either of the reduced diameter portions, side portions, end portions, conduits, ports, piston receiving openings, etc. can be considered "first" or "second." The specific one designated as "first" or "second" in the drawings is not a limitation on the present invention.

The embodiments described above are exemplary embodiments of a the present invention. Those skilled in the art may now make numerous uses of, and departures from, the above-described embodiments without departing from the inventive concepts disclosed herein. Accordingly, the present invention is to be defined solely by the scope of the following claims.

What is claimed is:

1. A bolt for use with a hydraulic disc brake caliper, the bolt comprising:
    a head, and
    a shaft extending outwardly from the head and defining a longitudinal axis, wherein the shaft includes
        a threaded portion formed at a distal end thereof, wherein the threaded portion has an outer surface and having a diameter,
        at least one channel defined in the outer surface of the threaded portion and the distal end of the shaft, such that when the threaded portion is threaded into an opening fluid can flow through the channel in a generally axial direction and past the distal end of the shaft,
        first and second reduced diameter portions defined at least partially circumferentially around the shaft, wherein the first and second reduced diameter portions have approximately the same diameter, and
        a blocking portion separating the first and second reduced diameter portions.

2. The bolt of claim 1 wherein the at least one channel extends parallel to the axis of the shaft.

3. The bolt of claim 2 wherein the shaft includes more than one channel defined therein that extend parallel to the longitudinal axis of the shaft.

4. The bolt of claim 3 wherein the first and second reduced diameter portions extend circumferentially around the shaft and have a diameter that is less than the threaded portion and the blocking portion.

5. The bolt of claim 4 wherein the first and second reduced diameter portions and the blocking portion are positioned between the threaded portion and the head.

6. The bolt of claim 4 wherein the shaft includes three channels that extend parallel to the longitudinal axis of the shaft and are spaced about 120° apart from one another.

7. The bolt of claim 2 wherein the channel has a generally constant depth in a generally axial direction.

8. The bolt of claim 7 wherein the channel extends axially through the entire threaded portion and at least partially in the first reduced diameter portion.

9. The bolt of claim 1 wherein the threaded portion includes a plurality of crests, and wherein the threaded portion has a generally constant diameter at the crests.

10. A bolt for use with a hydraulic disc brake caliper, the bolt comprising:
    a head, and
    a shaft extending outwardly from the head and defining a longitudinal axis, wherein the shaft includes a threaded portion formed at a distal end thereof,
        a plurality of channels defined in the outer surface of the shaft and extending approximately parallel to the longitudinal axis of the shaft,
        first and second reduced diameter portions defined circumferentially around the shaft, wherein the first and second reduced diameter portions have approximately the same diameter, and
        a blocking portion separating the first and second reduced diameter portions, wherein the first and second reduced diameter portions and the blocking portion are positioned between the threaded portion and the head, and wherein the channels extend from the first reduced diameter, through the threaded portion and through the distal end of the shaft, such that when the threaded portion is threaded into an opening fluid can flow through the channels in a direction that is generally parallel to longitudinal axis of the shaft and past the distal end of the shaft.

11. The bolt of claim 10 wherein the channels have a generally constant depth in a direction that is generally parallel to the longitudinal axis of the shaft.

12. The bolt of claim 11 wherein the shaft includes three channels that extend parallel to the longitudinal axis of the shaft and are spaced about 120° apart from one another.

* * * * *